(12) United States Patent
Takanashi et al.

(10) Patent No.: US 11,312,035 B2
(45) Date of Patent: Apr. 26, 2022

(54) CUTTING DEVICE AND CUTTING METHOD OF CORD-EMBEDDED RUBBER SHEET MEMBER

(71) Applicant: The Yokohama Rubber Co., LTD., Tokyo (JP)

(72) Inventors: Yuta Takanashi, Shinshiro (JP); Mitsuhisa Kawaguchi, Ise (JP); Kazushige Yasuda, Ise (JP); Daisen Hayashi, Kanagawa (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/269,446

(22) PCT Filed: Jul. 2, 2019

(86) PCT No.: PCT/JP2019/026353
§ 371 (c)(1),
(2) Date: Feb. 18, 2021

(87) PCT Pub. No.: WO2020/039760
PCT Pub. Date: Feb. 27, 2020

(65) Prior Publication Data
US 2021/0308892 A1 Oct. 7, 2021

(30) Foreign Application Priority Data
Aug. 23, 2018 (JP) .............................. JP2018-156072

(51) Int. Cl.
*B26D 1/18* (2006.01)
*B26D 3/00* (2006.01)
(Continued)

(52) U.S. Cl.
CPC ............... *B26D 1/18* (2013.01); *B26D 3/003* (2013.01); *B26D 3/02* (2013.01); *B29D 30/46* (2013.01); *B29D 2030/466* (2013.01)

(58) Field of Classification Search
CPC .......... B26D 1/18; B26D 1/185; B26D 3/003; B26D 3/02; B26D 3/00; B26D 1/157; B29D 30/46; B29D 2030/466
(Continued)

(56) References Cited

U.S. PATENT DOCUMENTS 7,913,393 B2 *   3/2011   Royle ................... B26B 21/225
                                                          30/50
8,695,465 B2 *   4/2014   Goellner .............. B23D 45/021
                                                          83/13
2007/0017099 A1  1/2007   Blackburn

FOREIGN PATENT DOCUMENTS

CA        2545953 A1    6/2005
CN        1902032 A     1/2007
(Continued)

*Primary Examiner* — Nhat Chieu Q Do
(74) *Attorney, Agent, or Firm* — Thorpe North & Western

(57) ABSTRACT

Provided are a cutting device and method. A blade receiving portion crossing a cord-embedded rubber sheet member is disposed in one surface side in a thickness direction of the rubber sheet member placed in a conveying mechanism. A cutting blade disposed in the other surface side is held by a holder that rotates about a turning shaft extending in the thickness direction of the rubber sheet member. In a state where a cutting-edge advancement direction turns about the turning shaft, a turning restoring force that restores the cutting-edge advancement direction to a preset moving direction is constantly applied by a turning restoring mechanism to the holder before cutting the rubber sheet member. The rubber sheet member is sandwiched in the thickness direction by the cutting blade and the blade receiving portion, and the cutting blade is moved in the extension direction of cords to cut between the cords.

12 Claims, 9 Drawing Sheets

(51) Int. Cl.
*B26D 3/02* (2006.01)
*B29D 30/46* (2006.01)

(58) Field of Classification Search
USPC ..................................... 83/951, 698.21, 167
See application file for complete search history.

(56) References Cited

FOREIGN PATENT DOCUMENTS

| | | | |
|---|---|---|---|
| JP | 1-171793 A | | 7/1989 |
| JP | 2007-511266 A | | 5/2007 |
| JP | 2013-163246 A | | 8/2013 |
| JP | 2013163246 A | * | 8/2013 |
| KR | 10-2006-0121176 A | | 11/2006 |
| WO | 2005/049289 A1 | | 6/2005 |

* cited by examiner

CUTTING DEVICE AND CUTTING METHOD OF CORD-EMBEDDED RUBBER SHEET MEMBER

TECHNICAL FIELD

The present technology relates to a cutting device and a cutting method of a cord-embedded rubber sheet member, and relates to particularly a cutting device and a cutting method that can provide a cord-embedded rubber sheet member accurately cut between cords embedded in unvulcanized rubber and along the cords.

BACKGROUND ART

A cord-embedded rubber sheet member including a number of cords such as steel cords and resin cords embedded at a predetermined pitch side by side in unvulcanized rubber is broadly used as a constituent member of a rubber product such as a tire. The cord-embedded rubber sheet member such as a belt member or a carcass material is used in manufacturing a tire. The cord-embedded rubber sheet member is used by being cut into a predetermined length.

Various known devices cut a rubber sheet member between cords embedded in unvulcanized rubber and along the cords (see Japan Unexamined Patent Publication No. 2013-163246). In a cutting device proposed in Japan Unexamined Patent Publication No. 2013-163246, a cutting blade having a round blade shape is held by a holder rotatably (turnably) around a vertical axis with respect to a rubber sheet member to be cut. Thus, when the rubber sheet member is sandwiched in the thickness direction between cords by the cutting blade and a blade receiving roll and the cutting blade is moved in the extension direction of the cords, the cutting blade is guided by the cords and the cutting-edge advancement direction turns appropriately. As a result, the cutting blade can move along the cords and the rubber sheet member can be cut into a predetermined length along the cords.

However, since the cutting blade is turnable around the vertical axis before cutting the rubber sheet member, the cutting-edge advancement direction of the cutting blade may deviate with respect to the extension direction of the cords when the cutting blade is at a standby position before cutting. In such a state, when the cutting blade is moved in a state in which the rubber sheet member is sandwiched by the cutting blade and the blade receiving roll, the rubber sheet member may be cut being biased toward one cord side and the cords may be exposed in a cutting surface.

Thus, there is room for enhancement in accurately cutting a rubber sheet member between cords and along the cords.

SUMMARY

The present technology provides a cutting device and a cutting method that can provide a cord-embedded rubber sheet member accurately cut between cords embedded in unvulcanized rubber and along the cords.

A cutting device of a cord-embedded rubber sheet member according to an embodiment of the present technology includes: a conveying mechanism in which a cord-embedded rubber sheet member is placed, the cord-embedded rubber sheet member including a number of cords embedded side by side in unvulcanized rubber; a blade receiving portion disposed in one surface side in a thickness direction of the rubber sheet member and crossing the rubber sheet member; and a cutting blade disposed in the other surface side in the thickness direction of the rubber sheet member and held by a holder rotating about an axial center extending in the thickness direction of the rubber sheet member whereby a cutting-edge advancement direction turns about the axial center. In a state in which the rubber sheet member is sandwiched in the thickness direction by the cutting blade and the blade receiving portion, the cutting blade moves toward an extension direction of the cords whereby the rubber sheet member is cut between the cords. The cutting device includes a turning restoring mechanism that constantly applies, to the holder before cutting the rubber sheet member, a turning restoring force that restores the cutting-edge advancement direction to a preset moving direction.

A cutting method of a cord-embedded rubber sheet member according to an embodiment of the present technology includes: placing a cord-embedded rubber sheet member in a conveying mechanism, the cord-embedded rubber sheet member including a number of cords embedded side by side in unvulcanized rubber; disposing a blade receiving portion in one surface side in a thickness direction of the rubber sheet member, the blade receiving portion crossing the rubber sheet member; bringing about a state in which a cutting-edge advancement direction of a cutting blade turns about an axial center by holding the cutting blade disposed in the other surface side in the thickness direction of the rubber sheet member by a holder rotating about the axial center extending in the thickness direction of the rubber sheet member; and cutting the rubber sheet member between the cords by sandwiching the rubber sheet member in the thickness direction by the cutting blade and the blade receiving portion and moving the cutting blade toward an extension direction of the cords. A turning restoring force that restores the cutting-edge advancement direction to a preset moving direction is constantly applied to the holder before cutting the rubber sheet member.

According to an embodiment of the present technology, in a stage before cutting the rubber sheet member, the turning restoring force that restores the cutting-edge advancement direction to a preset moving direction is constantly applied to the holder. Thus, even when the cutting-edge advancement direction of the cutting blade turns about the axial center, the cutting-edge advancement direction is regulated to a preset moving direction by the turning restoring force. Accordingly, the cutting-edge advancement direction can be positioned accurately toward the extension direction of cords between the cords of the rubber sheet member. Thus, the rubber sheet member is sandwiched in the thickness direction by the cutting blade and the blade receiving portion, and the cutting blade is moved in the extension direction of the cords. Thus, the rubber sheet member can be cut accurately between the cords and along the cords.

DETAILED DESCRIPTION

Hereinafter, a cutting device and a cutting method of a cord-embedded rubber member according to an embodiment of the present technology will be described on the basis of embodiments with reference to the drawings.

Figure 1:
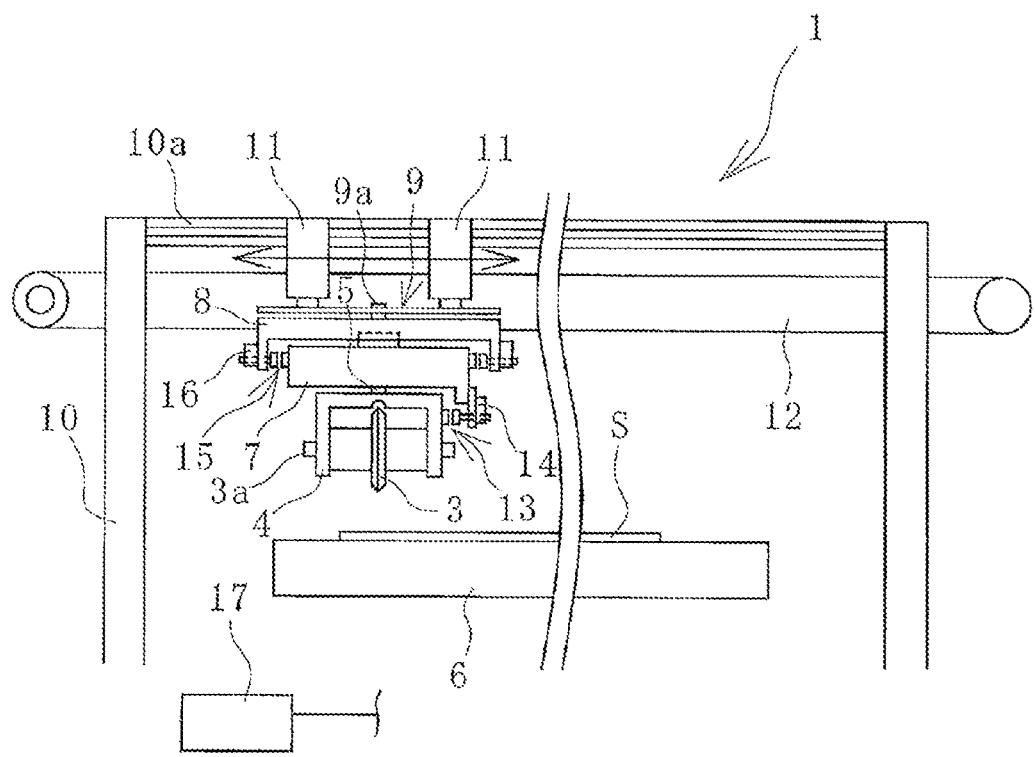
FIG. 1 is an explanatory diagram illustrating a main portion of a cutting device according to an embodiment of the present technology in a front view.
Figure 2:
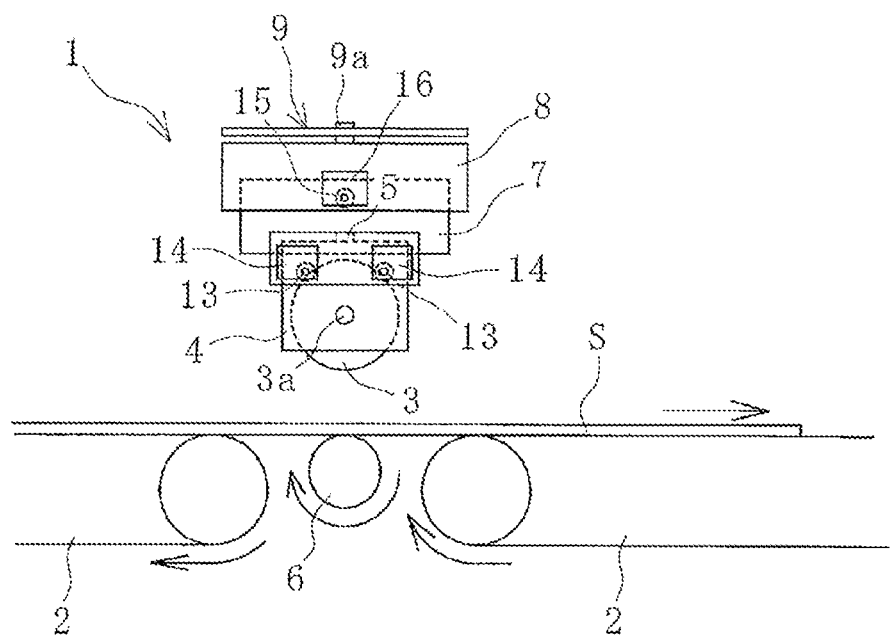
FIG. 2 is an explanatory diagram illustrating a configuration of a portion of FIG. 1 in a side view.
Figure 3:
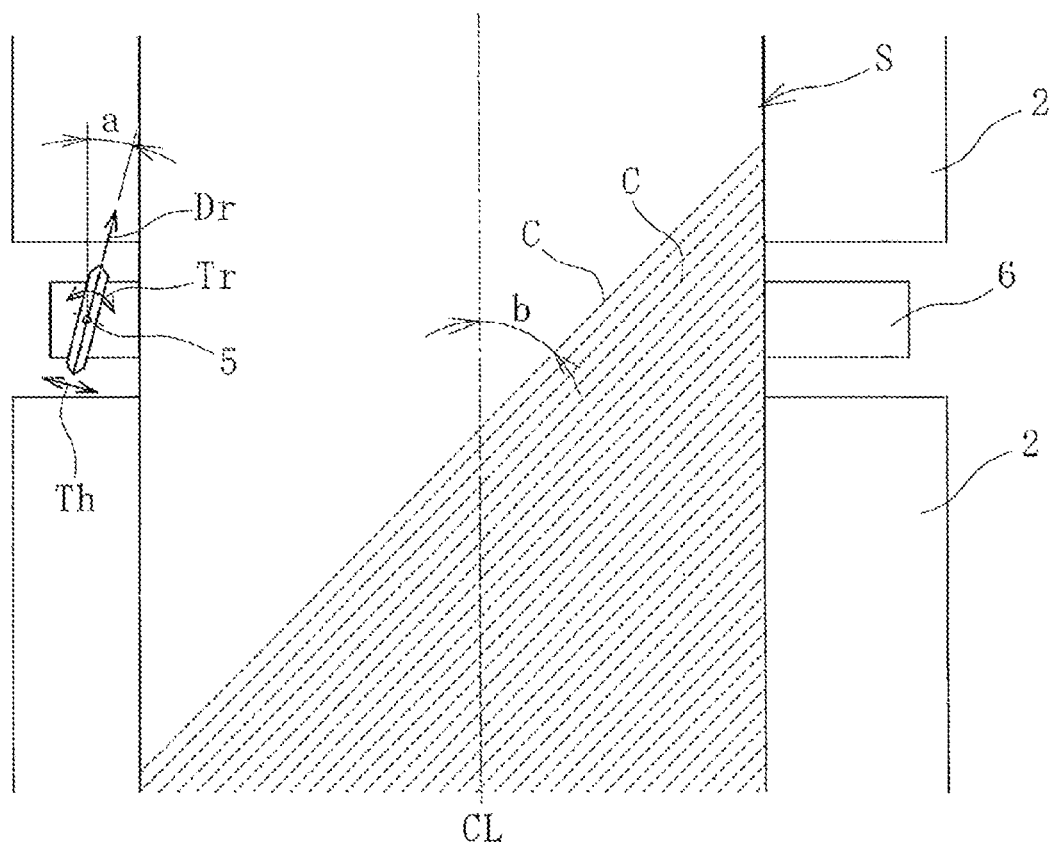
FIG. 3 is an explanatory diagram illustrating a configuration of a portion of the cutting device of FIG. 1 in a plan view.

A cutting device 1 of a cord-embedded rubber member (hereinafter referred to as a cutting device 1) according to an embodiment to the present technology illustrated in FIGS. 1 to 3 is used in cutting a cord-embedded rubber sheet member S into a predetermined length at a predetermined angle a with respect to the longitudinal direction. The rubber sheet member S is a member including a number of cords C embedded in unvulcanized rubber side by side at a predetermined pitch. In the drawings, the cords C are partially omitted. A dot-dash line CL in the drawing indicates a center position in the width direction of a conveying mechanism 2 and a blade receiving portion 6, and the extension direction of the dot-dash line CL is the extension direction of the conveying mechanism 2 (the rubber sheet member S placed in the conveying mechanism 2).

A steel cord, a cord similar to a steel cord, a resin cord, or the like that serves as a reinforcing member is used as the cords C, and for example, a plurality of wire strands are twisted to constitute the cords C. The cords C are embedded at a predetermined inclination angle b with respect to the longitudinal direction of the rubber sheet member S.

The cutting device 1 includes the conveying mechanism 2 in which the rubber sheet member S is placed, the blade receiving portion 6 disposed adjacent to the conveying mechanism 2, and a cutting blade 3 that cuts the rubber sheet member S. Additionally, a control unit 17 that controls movement of various mechanisms described below that constitute the cutting device 1 is provided. The blade receiving portion 6 is disposed in one surface side in the thickness direction of the rubber sheet member S and the cutting blade 3 is disposed in the other surface side in the thickness direction of the rubber sheet member S. In FIGS. 1 to 3, the cutting blade 3 stands by at a standby position before cutting the rubber sheet member S.

In the embodiment, a belt conveyor is used as the conveying mechanism 2, but no such limitation is intended, and various known mechanisms similar to this can be used. The rubber sheet member S is conveyed by the conveying mechanism 2 to the next step such as a forming drum. In FIG. 3, a lower side corresponds to a front side (downstream side) in the conveying direction.

The blade receiving portion 6 is disposed in the middle of a conveying path of the rubber sheet member S. In the embodiment, the blade receiving portion 6 extends between the conveying mechanism 2 in a front side and the conveying mechanism 2 in a rear side in a direction orthogonal to the extension direction of the conveying mechanism 2. Thus, the blade receiving portion 6 is disposed crossing the rubber sheet member S at a lower position of the rubber sheet member S placed in the conveying mechanism 2. For example, a roller body rotatably supported is used as the blade receiving portion 6. In the embodiment, a roller body that is rotationally driven is used for the blade receiving portion 6, and an outer circumferential surface of the roller body is brought into contact with one surface in the thickness direction of the rubber sheet member S and rolls.

For example, a rotary round blade that free-rotates about a center axis 3a is used as the cutting blade 3. Both sides of an outer circumferential edge of the cutting blade 3 are inclined surfaces, and a cutting edge is formed. The cutting blade 3 is supported by a holder 4 rotatably about the center axis 3a. Note that a non-rotating blade can also be used as the cutting blade 3. The holder 4 is supported by a support body 7 disposed above the holder 4 via a turning shaft 5. The support body 7 is held being slidable in a thrust direction Th by a thrust guide 8 disposed above the support body 7. The thrust guide 8 is supported by a cutting-edge direction setting mechanism 9 disposed above the thrust guide 8.

Figure 4:
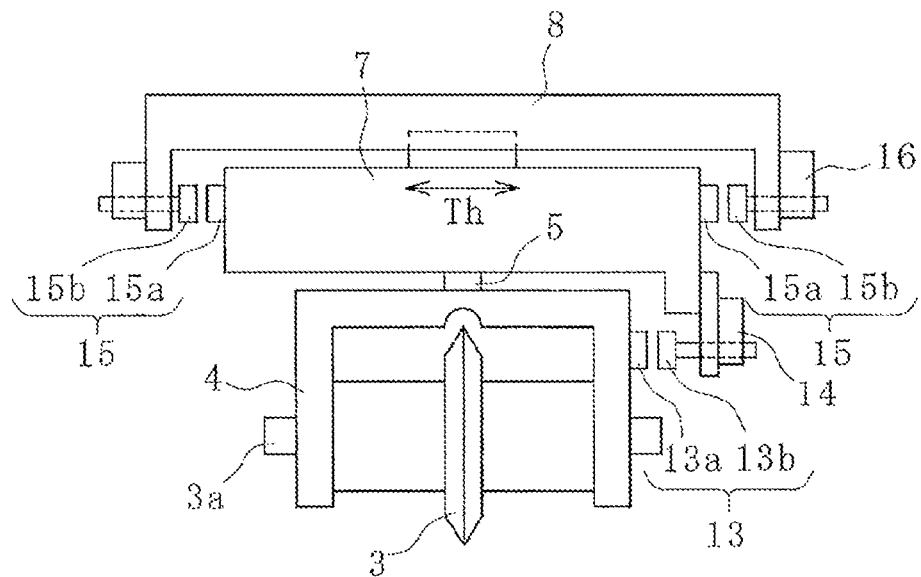
FIG. 4 is an explanatory diagram illustrating s periphery of a cutting blade of FIG. 1 at an enlarged scale in a front view.
Figure 5:
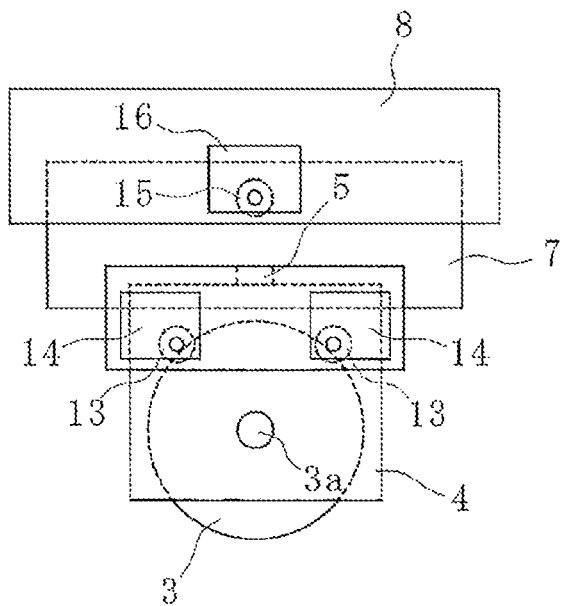
FIG. 5 is an explanatory diagram illustrating a configuration of FIG. 4 in a side view.
Figure 6:
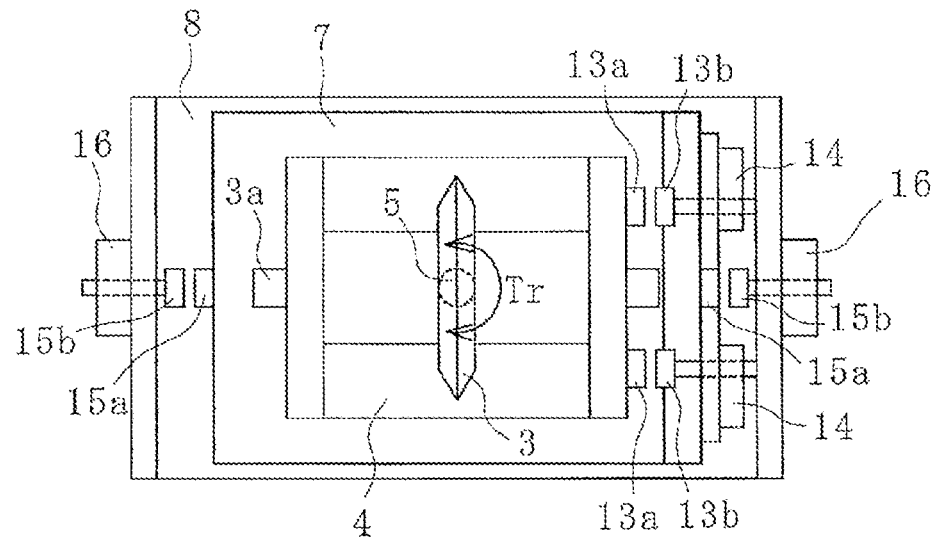
FIG. 6 is an explanatory diagram illustrating a configuration of FIG. 4 in a bottom view.

Specifically, as illustrated in FIGS. 4 to 6, the holder 4 is connected to the support body 7 rotatably about an axial center of the turning shaft 5 that extends in the thickness direction of the rubber sheet member S placed in the conveying mechanism 2. Thus, a cutting-edge advancement direction Dr (the direction of the cutting edge of the cutting blade 3) of the cutting blade 3 held by the holder 4 turns (sways in a turning direction Tr) about the axial center of the turning shaft 5.

An upper end portion of the support body 7 engages with the thrust guide 8 and is slidable in the thrust direction Th. Thrust direction Th refers to a direction orthogonal to the turning shaft 5 and parallel to the axial direction of the center axis 3a of the cutting blade 3 that is stationary, which will be described below, and is a direction crossing the cords C in cutting the rubber sheet member S. The thrust guide 8 and the support body 7 engaging with the thrust guide 8 are thrust mechanisms that slide the holder 4 and the cutting blade 3 in the thrust direction Th. The thrust guide 8 can be provided in a discretionary manner. The thrust guide 8 is supported rotatably about a turning shaft 9a of the cutting-edge setting mechanism 9 that is coaxial with the turning shaft 5, but is configured to be fixed at a desired rotational position (a turning position).

Magnets 13a are attached to one side surface of the holder 4 before and after the moving direction of the cutting blade 3, respectively, with the turning shaft 5 sandwiched between the magnets 13a. Additionally, two magnets 13b are installed in one side surface of the support body 7 via a bracket. The two magnets 13a attached to the holder 4 and the two magnets 13b installed in the support body 7 are opposed to each other at intervals. The magnets 13a, 13b that are opposed to each other in this manner have magnetic forces of the same polarity (S poles or N poles).

Even when the cutting-edge advancement direction Dr of the cutting blade 3 is turnable about the axial center of the turning shaft 5, the magnetic forces of the magnets 13a, 13b opposed to each other repel each other at two locations sandwiching the turning shaft 5, and the cutting-edge advancement direction Dr becomes stationary at a position (a neutral position) where the magnetic forces of the magnets 13a, 13b are balanced. The cutting-edge direction setting mechanism 9 is used to adjust the cutting-edge advancement direction Dr that is stationary to become a preset moving direction of the cutting-edge advancement direction Dr. Specifically, although the cutting-edge advancement direction Dr that is stationary can be set at the discretionary angle a with respect to the dot-dash line CL, the cutting-edge direction setting mechanism 9 is used to adjust the cutting-edge advancement direction Dr to become a preset moving direction. That is, in this state, the magnetic forces of the magnets 13a, 13b are constantly applied to the holder 4 as a turning restoring force that restores the cutting-edge advancement direction Dr to a preset moving direction.

In the embodiment, a turning adjustment mechanism 14 is provided in each of the two magnets 13b installed in the support body 7. The turning adjustment mechanism 14 moves the magnets 13b closer to and being separated from the magnets 13a that are opposed. For example, a shaft connected to each of the magnets 13b engages with a bracket fixed to the support body 7. Then, a motor that rotates the shaft connected to the magnet 13b is provided as the turning adjustment mechanism 14. The shaft connected to the magnet 13b is turned by the motor, and thus the magnet 13b can be moved closer to and being separated from the magnet 13a that are opposed.

When the separation distance between the magnets 13a, 13b is increased, repellence due to the magnetic forces of the magnets 13a, 13b becomes weak or disappears. Thus, the turning adjustment mechanism 14 has a function to reduce the turning restoring force described above or to block application of the turning restoring force with respect to the cutting blade 3. The turning adjustment mechanism 14 can be provided in a discretionary manner.

Magnets 15a are attached to both side surfaces of the support body 7, respectively. Additionally, magnets 15b are also installed in both inner side surfaces of the thrust guide 8, respectively. The magnets 15a, 15b are opposed to each other at intervals. The magnets 15a, 15b that are opposed to each other in this manner have magnetic forces of the same polarity (S poles or N poles).

The cutting blade 3 is held by a thrust mechanism and is slidable in the thrust direction Th that is orthogonal to the cutting-edge advancement direction Dr described above that is stationary. Note that in FIGS. 1 and 2, for easy understanding of a shape of the cutting blade 3, a state in which the cutting-edge advancement direction Dr is oriented in the conveying direction is described.

Even when the cutting-edge advancement direction Dr described above that is stationary is slidable in the thrust direction Th, the magnetic forces of the magnets 15a, 15b that are opposed to each other repel each other, and accordingly, the cutting-edge advancement direction Dr is restored to a preset thrust direction position. That is, in this state, the magnetic forces of the magnets 15a, 15b are constantly applied to the support body 7 as a thrust restoring force that restores the blade edge advancement direction Dr to a preset thrust direction position.

In the embodiment, a thrust adjustment mechanism 16 is provided in each of the two magnets 15b installed in the thrust guide 8. The thrust adjustment mechanism 16 moves the magnet 15b closer to and being separated from the magnet 15a that is opposed. For example, a shaft connected to the magnet 15b engages with a side surface of the thrust guide 8. Then, a motor that rotates the shaft connected to the magnet 15b is provided as the thrust adjustment mechanism 16. The shaft connected to the magnet 15b is rotated by the motor, and thus the magnet 15b can be moved closer to and being separated from the magnet 15a that is opposed.

When the separation distance between the magnets 15a, 15b is increased, repellence due to the magnetic forces of the magnets 15a, 15b becomes weak or disappears. Thus, the thrust adjustment mechanism 16 has a function to reduce the thrust restoring force described above or block application of the thrust restoring force with respect to the cutting blade 3. The thrust adjustment mechanism 16 can be provided in a discretionary manner.

A vertical movement mechanism 11 is connected to the cutting-edge direction setting mechanism 9. For example, a fluid cylinder or the like is used as the vertical movement mechanism 11. The cutting-edge direction setting mechanism 9, the thrust guide 8, the support body 7, the holder 4, and the cutting blade 3 can be moved integrally closer to and being separated from the blade receiving portion 6 by the vertical movement mechanism 11.

The vertical movement mechanism 11 engages with a movement guide 10a disposed in parallel to the extension direction of the blade receiving portion 6 and crossing the conveying mechanism 2 (the rubber sheet member S). The vertical movement mechanism 11 is freely movable in the extension direction of the movement guide 10a (the extension direction of the blade receiving portion 6) with respect to the movement guide 10a supported by a guide frame 10. Thus, the vertical movement mechanism 11, the cutting-edge direction setting mechanism 9, the thrust guide 8, the support body 7, the holder 4, and the cutting blade 3 integrally move in a direction crossing the conveying mechanism 2.

The vertical movement mechanism 11 is attached to a position return mechanism 12 that is installed crossing the conveying mechanism 2. The position return mechanism 12 includes, for example, a belt member having an annular shape and connected to the vertical movement mechanism 11, a pair of pulleys on which the belt member is mounted, and a drive motor that rotates one of the pulleys. Thus, the vertical movement mechanism 11 that is freely moved, the cutting-edge direction setting mechanism 9, the thrust guide 8, the support body 7, the holder 4, and the cutting blade 3 can be returned to desired positions (for example, standby positions) by operating the position return mechanism 12.

Hereinafter, a procedure of cutting the rubber sheet member S into a predetermined length between the cords C and along the cords C by using the cutting device 1 will be described.

As illustrated in FIGS. 1 to 3, the rubber sheet member S is placed in the conveying mechanism 2, and the conveying mechanism 2 is operated to convey the rubber sheet member S toward the front side by a predetermined distance. The blade receiving portion 6 is also rotationally driven in synchronization at conveying speed identical to conveying speed by the conveying mechanism 2. At this time, the blade receiving portion 6 may be free-rotated. The cutting blade 3 stands by at a standby position of one end portion in the width direction of the rubber sheet member S at an upper position at which the cutting blade 3 does not come into contact with the rubber sheet member S.

At the standby position, the cutting-edge advancement direction Dr is set in a direction identical to the extension direction of the cords C by using the cutting-edge direction setting mechanism 9. In other words, the predetermined angle a is set to an angle identical to the inclination angle b of the cords C. In the embodiment, although the cutting-edge advancement direction Dr is turnable about the axial center of the turning shaft 5, since a turning restoring force is constantly applied to the holder 4 by the turning restoring mechanism 13, the cutting-edge advancement direction Dr is regulated to be oriented in the extension direction of the cords C. Thus, the cutting-edge advancement direction Dr is positioned being oriented in the extension direction of the cords C accurately at the standby position.

Additionally, although the cutting-edge advancement direction Dr is slidable in the thrust direction Th, since a thrust restoring force is constantly applied to the support body 7 by a thrust restoring mechanism 15, the cutting-edge advancement direction Dr is regulated to a preset thrust direction position as the standby position. Thus, the cutting-edge advancement direction Dr is positioned between the cords C accurately at the standby position.

Figure 7:
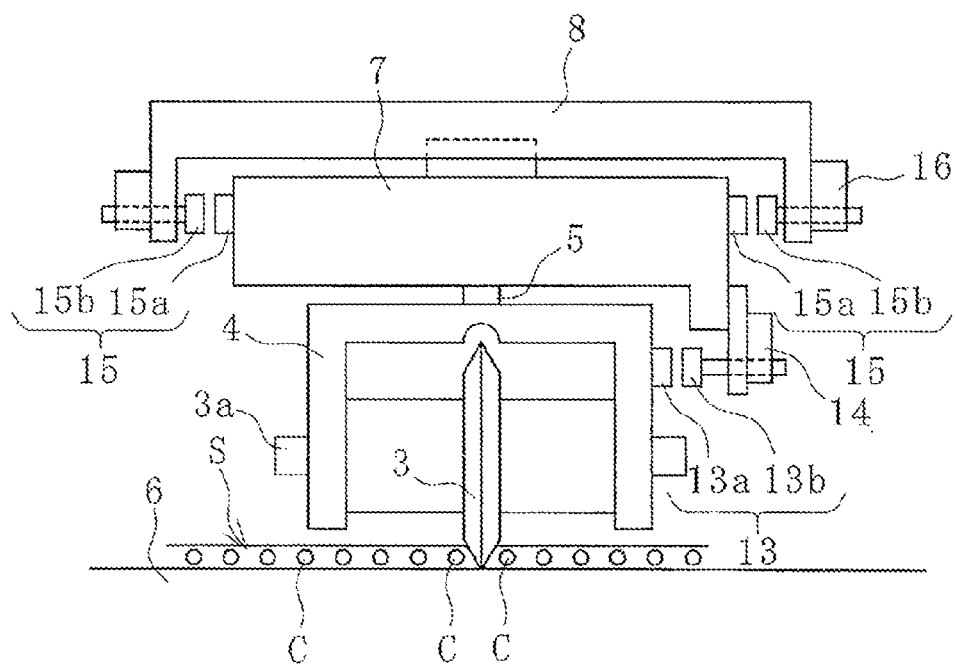
FIG. 7 is an explanatory diagram illustrating a cutting blade cutting a rubber sheet member in a front view.

Then, in cutting the rubber sheet member S, while the cutting blade 3 remains in this state, the cutting blade 3 is moved downward from the standby position toward the rubber sheet member S by the vertical movement mechanism 11. Accordingly, as illustrated in FIG. 7, the rubber sheet member S is sandwiched between the cords C in the thickness direction by the cutting blade 3 and the blade receiving portion 6. Specifically, unvulcanized rubber between the cords C is cut by strongly pressing the unvulcanized rubber by the cutting blade 3 and the blade receiving portion 6, and the cutting edge of the cutting blade 3 is brought into contact with the blade receiving portion 6.

Figure 8:
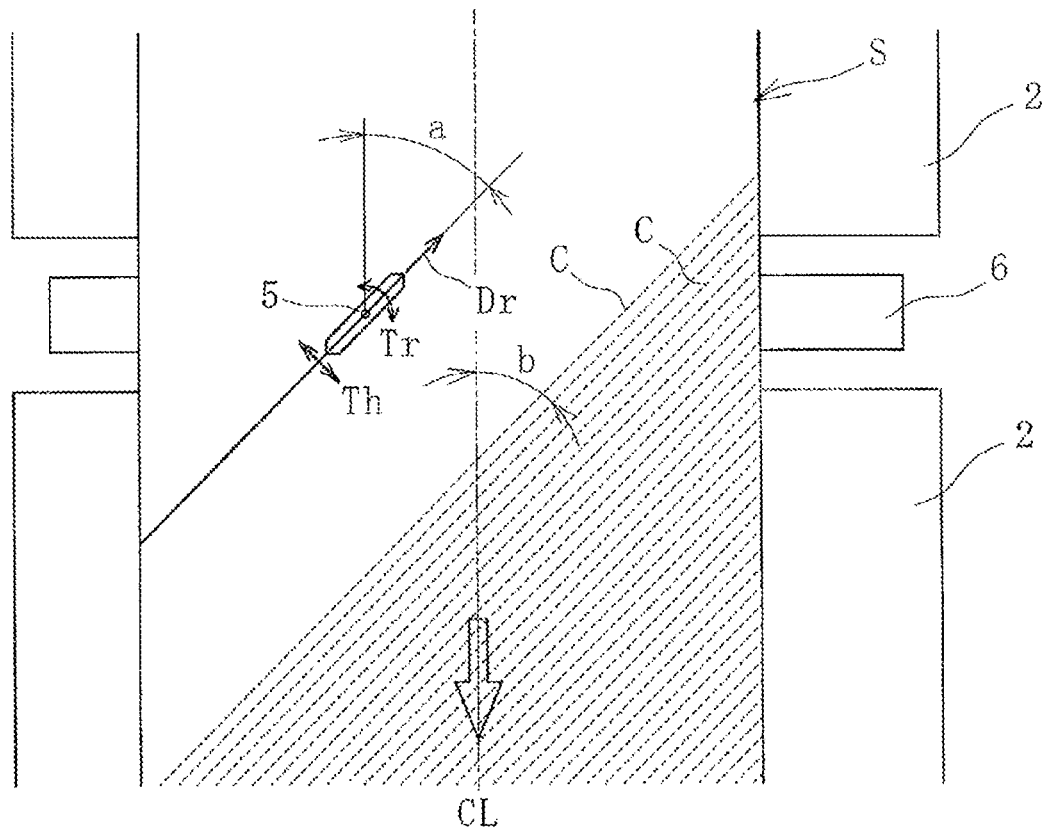
FIG. 8 is an explanatory diagram illustrating a cutting blade cutting a rubber sheet member in a plan view.

Then, as illustrated in FIG. 8, the rubber sheet member S is conveyed to the front side in the conveying direction, and accordingly, the cutting blade 3 is moved toward the extension direction of the cords C and moved to the other end in the width direction of the rubber sheet member S. Specifically, both of the conveying mechanism 2 and the blade receiving portion 6 are operated in synchronization at the conveying speed of the conveying mechanism 2 identical to the conveying speed of the blade receiving portion 6.

As the rubber sheet member S is conveyed to the front side, the cutting blade 3 that brings into a state in which the blade receiving portion 6 and the rubber sheet member S are sandwiched between the cords C rolls to the other end in the width direction of the rubber sheet member S toward the extension direction of the cord C. In the embodiment, a turning restoring force and a thrust restoring force are applied to the cutting blade 3. Thus, the cutting blade 3 is guided by the cords C present in both sides of the cutting blade 3, and moves along the cords C, following the cords C between the cords C. Thus, the rubber sheet member S can be cut accurately into a predetermined length between the cords C and along the cords C. Since the rubber sheet member S can be cut reliably between the cords C, a defect such as exposure of the cords C in a cutting surface can be prevented.

Subsequently, the position return mechanism 12 is actuated, and the cutting blade 3 is moved from the other end to one end in the width direction of the rubber sheet member S, and stands by. After that, similar steps are performed, and thus the rubber sheet member S can be cut into a predetermined length.

Figure 9:
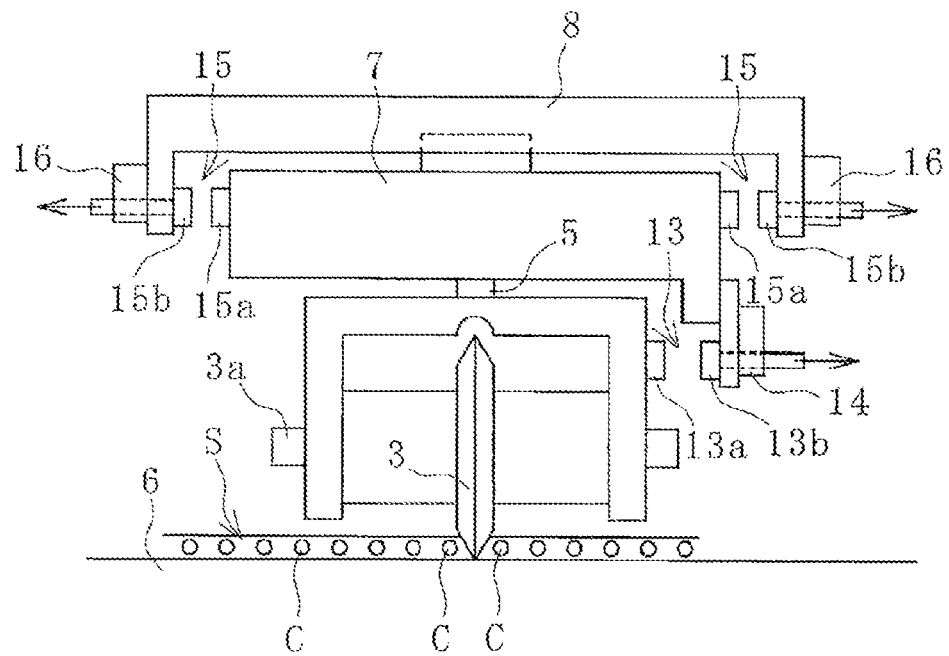
FIG. 9 is an explanatory diagram illustrating another form of a cutting blade cutting a rubber sheet member in a front view.

As illustrated in FIG. 9, during cutting of the rubber sheet member S, the turning restoring force can also be reduced to become smaller than the turning restoring force applied before cutting the rubber sheet member S, or application of the turning restoring force can also be blocked by the turning adjustment mechanism 14. Additionally, the thrust restoring force can also be reduced to become smaller than the thrust restoring force applied before cutting the rubber sheet member S, or application of the thrust restoring force can also be blocked by the thrust adjustment mechanism 15.

In the embodiment described above, a turning restoring force and a thrust restoring force are also applied to the cutting blade 3 during cutting of the rubber sheet member S. In this form, the cutting-edge advancement direction Dr sways in the turning direction Tr along the extension direction of the cords C and easily slides in the thrust direction Th. Thus, it becomes more advantageous to cut the rubber sheet member S accurately between the cords C and along the cords C.

Figure 10:
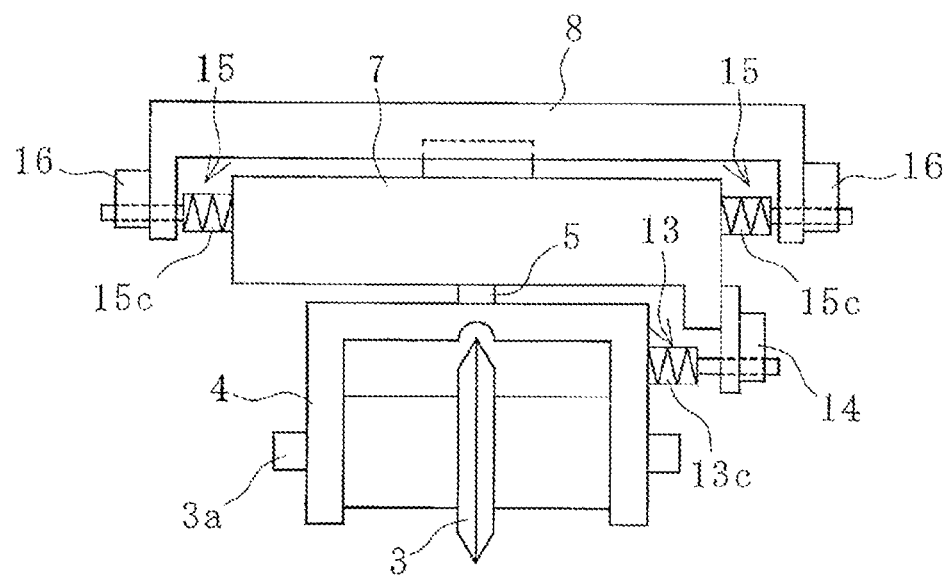
FIG. 10 is an explanatory diagram illustrating a periphery of a cutting blade of another embodiment of a cutting device in a front view.

As illustrated in FIG. 10, a biasing force of springs 13c, 15c can also be used to apply the turning restoring force and the thrust restoring force. As a turning adjustment mechanism 14, the spring 13c may be provided being movable closer to and movable being separated from a side surface of a holder 4. A specific mechanism may be similar to the case of using the magnet 13b. As a thrust adjustment mechanism 16, the spring 15c may be provided being movable closer to and movable being separated from a side surface of a support member 7. A specific mechanism may be similar to the case of using the magnet 15b.

Figure 11:
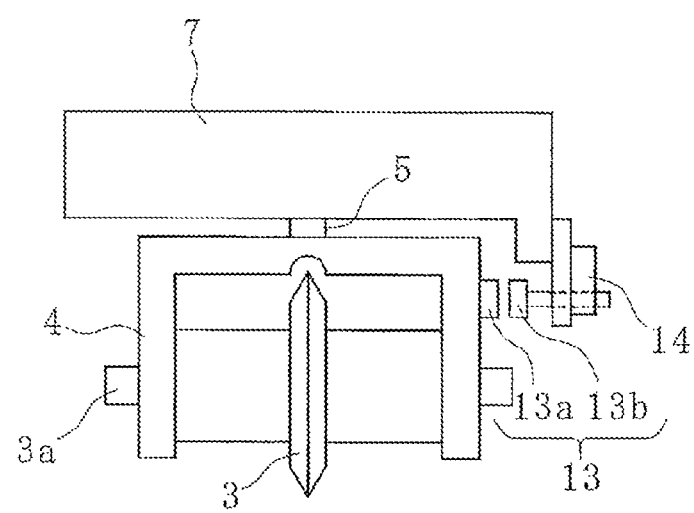
FIG. 11 is an explanatory diagram illustrating a periphery of a cutting blade of further another embodiment of a cutting device in a front view.

As illustrated in FIG. 11, a configuration where the thrust mechanism and the thrust adjustment mechanism 16 used in the embodiments described above are omitted can also be made. In the embodiment, as a turning restoring mechanism 13, magnets 13a, 13b are provided, but instead a spring 13c can also be provided. In the embodiment, a device structure is simplified, and a rubber sheet member S can be cut between cords C and along the cords C with sufficient accuracy for practical use.

Figure 12:
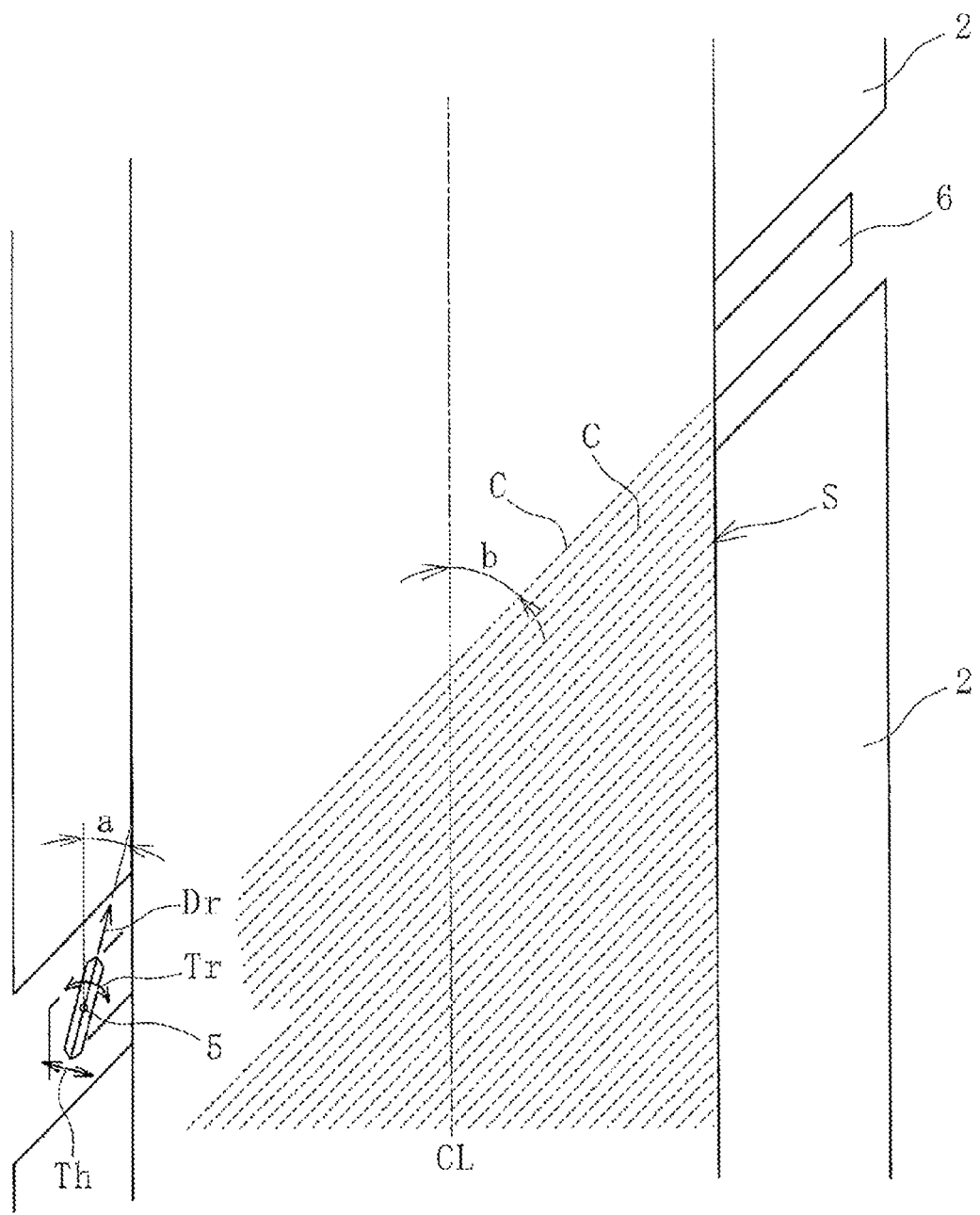
FIG. 12 is an explanatory diagram illustrating a configuration of a portion of another embodiment of a cutting device in a plan view.
Figure 13:
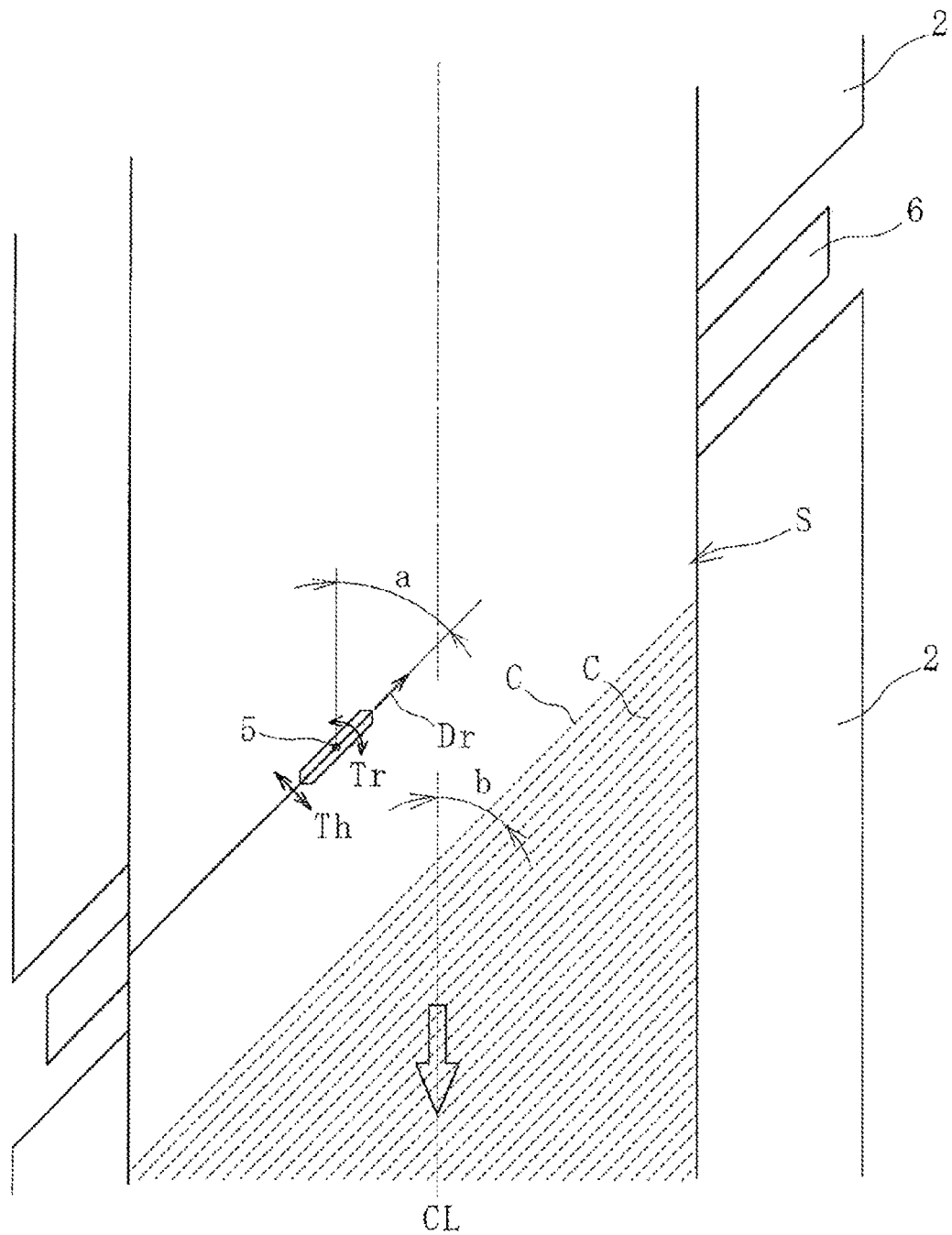
FIG. 13 is an explanatory diagram illustrating a cutting blade of FIG. 12 cutting a rubber sheet member in a plan view.

In an embodiment of a cutting device 1 illustrated in FIG. 12, a blade receiving portion 6 extends in a direction identical to the extension direction of cords C of a rubber sheet member S placed in a conveying mechanism 2. In the embodiments described above, as illustrated in FIGS. 3 and 8, the blade receiving portion 6 extends in a direction orthogonal to the conveying direction of the conveying mechanism 2 and extends in a direction crossing the cords C of the rubber sheet member S placed in the conveying mechanism 2. In other words, in the embodiments described above, the blade receiving portion 6 extends in the width direction of the rubber sheet member S, and the cutting blade 3 moves in the width direction of the rubber sheet member S. On the other hand, in the embodiment, as illustrated in FIG. 13, a cutting blade 3 moves in the extension direction of the blade receiving portion 6 (the extension direction of the cords C). Other main configurations are similar to those of the embodiments described above. In the embodiment, the various specifications described in the embodiments described above can also be employed.

A procedure of cutting the rubber sheet member S by using the embodiment is similar to the procedure in the embodiments described above, and the cutting blade 3 is moved downward from a standby position toward the rubber sheet member S. Accordingly, the rubber sheet member S is sandwiched between the cords C in the thickness direction by the cutting blade 3 and the blade receiving portion 6, and unvulcanized rubber of the cords C is cut.

When the cutting device 1 of the embodiment includes the thrust mechanism described above, since the cutting blade 3 slides in a direction orthogonal to the extension direction of the cords C, force of the cutting blade 3 to press the unvulcanized rubber between the cords C is difficult to disperse. Accordingly, the linearity of the cut is easily ensured, and the cutting blade 3 is moved in the extension direction of the blade receiving portion 6, and thus a defect such as exposure of the cords C is avoided, and the rubber sheet member S is easily cut along the cords C accurately.

The invention claimed is:

1. A cutting device of a cord-embedded rubber sheet member, the cutting device comprising:
    a conveying mechanism in which a cord-embedded rubber sheet member is placed, the cord-embedded rubber sheet member comprising a number of cords embedded side by side in unvulcanized rubber;
    a blade receiving portion disposed in one surface side in a thickness direction of the rubber sheet member and crossing the rubber sheet member; and
    a cutting blade disposed in an other surface side in the thickness direction of the rubber sheet member and held by a holder rotating about an axial center extending in the thickness direction of the rubber sheet member whereby a cutting-edge advancement direction turns about the axial center,
    in a state in which the rubber sheet member is sandwiched in the thickness direction by the cutting blade and the blade receiving portion, the cutting blade moving toward an extension direction of the cords whereby the rubber sheet member is cut between the cords, and
    the cutting device comprising a turning restoring mechanism including a magnet that constantly applies a magnetic force, to the holder before cutting the rubber sheet member, as a turning restoring force that restores the cutting-edge advancement direction to a preset moving direction.

2. The cutting device of a cord-embedded rubber sheet member according to claim 1, wherein the turning restoring force is also constantly applied by the turning restoring mechanism to the holder during cutting of the rubber sheet member.

3. The cutting device of a cord-embedded rubber sheet member according to claim 2, comprising
    a thrust mechanism that has a support body that holds the cutting blade being slidable in a thrust direction orthogonal to the cutting-edge advancement direction, and
    a thrust restoring mechanism that constantly applies, to the support body before cutting the rubber sheet member, a thrust restoring force that restores the cutting blade to a preset thrust direction position.

4. The cutting device of a cord-embedded rubber sheet member according to claim 3, the thrust restoring force is also constantly applied by the thrust restoring mechanism to the support body during cutting of the rubber sheet member.

5. The cutting device according to claim 4, wherein the cutting blade is a rotating round blade comprising a cutting edge formed in an outer circumferential edge, and the blade receiving portion rolls bringing an outer circumferential surface into contact with one surface in the thickness direction of the rubber sheet member.

6. The cutting device of a cord-embedded rubber sheet member according to claim 1, comprising a turning adjustment mechanism that reduces the turning restoring force applied to the holder during cutting of the rubber sheet member to be smaller than the turning restoring force applied to the holder before cutting the rubber sheet member, or blocks application of the turning restoring force with respect to the holder during cutting of the rubber sheet member.

7. The cutting device of a cord-embedded rubber sheet member according to claim 1, comprising
    a thrust mechanism that has a support body that holds the cutting blade being slidable in a thrust direction orthogonal to the cutting-edge advancement direction, and
    a thrust restoring mechanism that constantly applies, to the support body before cutting the rubber sheet member, a thrust restoring force that restores the cutting blade to a preset thrust direction position.

8. The cutting device of a cord-embedded rubber sheet member according to claim 7, the thrust restoring force is also constantly applied by the thrust restoring mechanism to the support body during cutting of the rubber sheet member.

9. The cutting device of a cord-embedded rubber sheet member according to claim 7, comprising a thrust adjustment mechanism that reduces the thrust restoring force applied to the support body during cutting of the rubber sheet member to be smaller than the thrust restoring force applied to the support body before cutting the rubber sheet member, or blocks application of the thrust restoring force with respect to the support body during cutting of the rubber sheet member.

10. The cutting device according to claim 1, wherein the cutting blade is a rotating round blade comprising a cutting edge formed in an outer circumferential edge, and the blade receiving portion rolls bringing an outer circumferential surface into contact with one surface in the thickness direction of the rubber sheet member.

11. A cutting method of a cord-embedded rubber sheet member, the cutting method comprising:
    placing a cord-embedded rubber sheet member in a conveying mechanism, the cord-embedded rubber sheet member comprising a number of cords embedded side by side in unvulcanized rubber;
    disposing a blade receiving portion in one surface side in a thickness direction of the rubber sheet member, the blade receiving portion crossing the rubber sheet member;
    bringing about a state in which a cutting-edge advancement direction of a cutting blade turns about an axial center by holding the cutting blade disposed in an other surface side in the thickness direction of the rubber sheet member by a holder rotating about the axial center extending in the thickness direction of the rubber sheet member; and
    cutting the rubber sheet member between the cords by sandwiching the rubber sheet member in the thickness direction by the cutting blade and the blade receiving portion and moving the cutting blade toward an extension direction of the cords,
    a turning restoring force, a magnetic force by a magnet, that restores the cutting-edge advancement direction to a preset moving direction being constantly applied to the holder before cutting the rubber sheet member.

12. The cutting method of a cord-embedded rubber sheet member according to claim 11, wherein
    the cutting blade is held to be slidable in a thrust direction orthogonal to the cutting-edge advancement direction by a support body, and
    a thrust restoring force that restores the support body to a preset thrust direction position is constantly applied to the support body before cutting the rubber sheet member.

* * * * *